Feb. 3, 1959 E. W. CONRAD 2,871,546
APPARATUS FOR FABRICATING POROUS WALLS FOR CONTROLLED
FLOW DIRECTION AND POROSITY
Original Filed Sept. 16, 1953 2 Sheets-Sheet 1

INVENTOR
EARL W. CONRAD

BY

ATTORNEYS

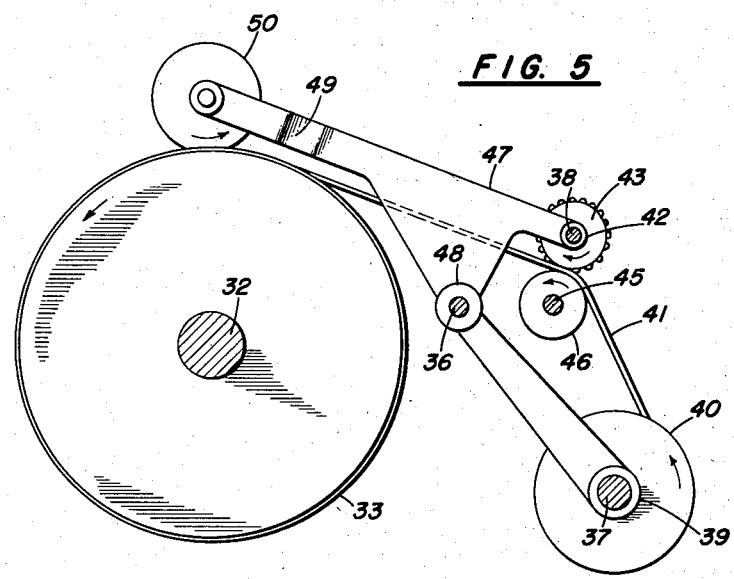
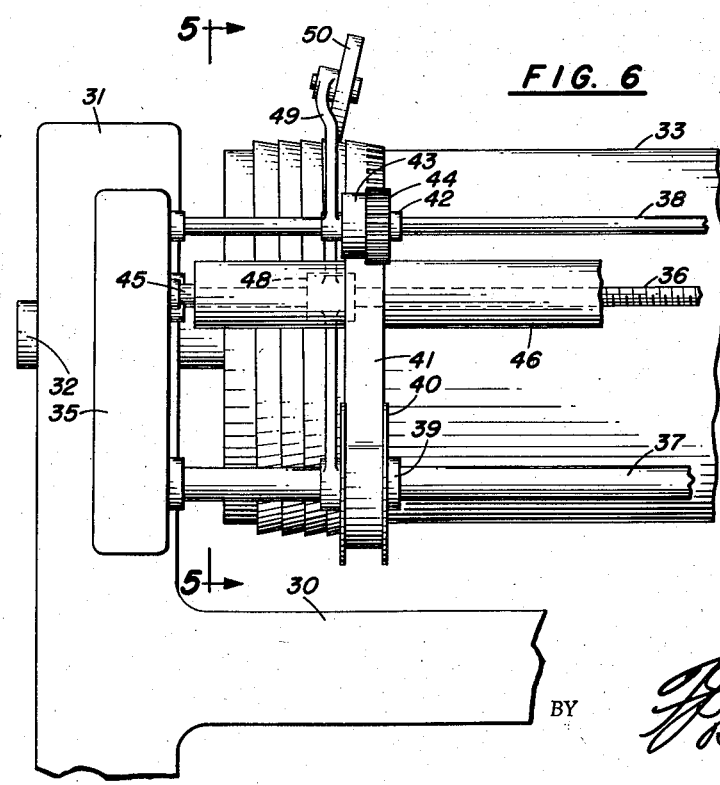

United States Patent Office 2,871,546
Patented Feb. 3, 1959

2,871,546

APPARATUS FOR FABRICATING POROUS WALLS FOR CONTROLLED FLOW DIRECTION AND POROSITY

Earl W. Conrad, Berea, Ohio

Original application September 16, 1953, Serial No. 380,628, now Patent No. 2,785,878, dated March 19, 1957. Divided and this application August 10, 1956, Serial No. 603,457

2 Claims. (Cl. 29—35)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for making heat resistant tubes with walls suitable for fluid cooling, as applied for example to afterburners of turbo-jet engines and is a division of my copending application Serial No. 380,628, filed September 16, 1953, now Patent No. 2,785,878, issued March 19, 1957.

Heretofore, use has been made of transpiration fluid cooling for heated fluid conduits by employment of wire cloth or porous sintered plates of stainless steel. A disadvantage common to these structures is that the coolant gases penetrating the material emerge in random jets of diverse direction and mass contact rather than in a controlled direction with uniform mass providing the most effective cooling. In addition, the wire cloth must be supported by additional frame units while the sintered plates have excessive weight.

In brief, the present invention comprises apparatus for assemblage of overlapping grooved strips so positioned that substantial structural strength is provided while controlled transpiration of coolant through the walls readily takes place.

An object of the invention is to provide apparatus for wall construction having sufficient structural strength to be self-supporting and at the same time, resistant to face pressures.

An object also is to provide apparatus for wall construction which has ducts therein, so alined as to emit ejected coolant in predetermined directions for efficient wall cooling.

Still another object is to provide apparatus for making a transpiration wall wherein ducts formed therethrough are of uniform size and relationship.

Other objects will appear on consideration of the following detailed description of a preferred embodiment of the invention together with the accompanying drawing in which:

Fig. 5 is an end view partly in section showing mechanism for fabricating the strip material into tubular form, as taken along lines 5—5 of Fig. 6; and Fig. 6 is a plan view of the mechanism of Fig. 5.

Figure 3:
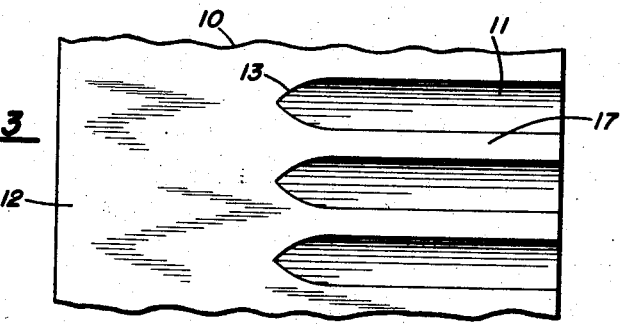
Fig. 3 is a view of a fragment of the structural strip used in building the material, as taken along lines 3—3 of Fig. 2.

Reference is made to Fig. 3 for a showing of the strip material which may be utilized in forming the transpiration wall. This is a thin flat strip 10, of metal of sufficient softness to take readily the knurling action of the groove former to produce grooves 11, the latter extending slightly over one half the strip side width in parallel directions leaving an ungrooved flat area 12. While the inclined pointed groove ends 13 are not necessary, they are advantageous in producing a smooth funnelling action on the incoming coolant.

Figure 1:
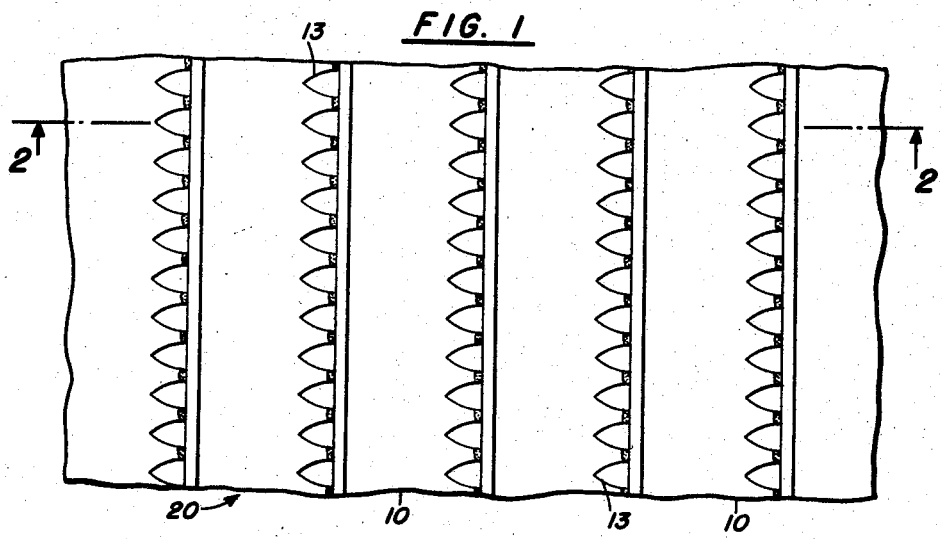
Fig. 1 is a plan view of a fragment of the material.
Figure 2:
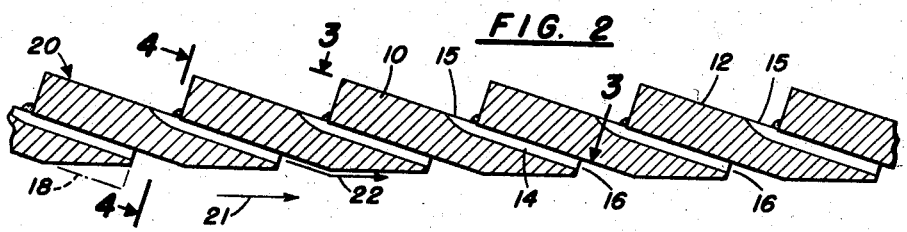
Fig. 2 is an edge view of a section of the material taken on lines 2—2 of Fig. 1.
Figure 4:
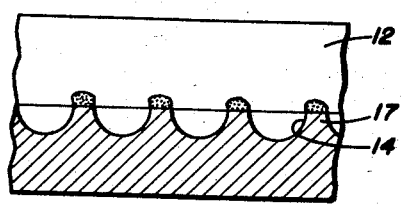
Fig. 4 is a detailed view showing the grooved metal surface for conducting coolant, as taken along lines 4—4 of Fig. 2.

To make the coolant structure, a plurality of these grooved strips 10 are overlapped to form a wall 20 as indicated in Figs. 1 and 2, the smooth plate section 12 of one strip overlying the grooves 11 of an adjacent strip to a point short of the groove length, thus providing a plurality of uniformly dimensioned and parallel ducts 14 between strips with exposed inlets 15 for coolant, such as air, and alined outlets 16 for the coolant jets. In this position the overlapping strips 10 are fixedly attached, as by welding, the base of strip section 12, for example, in the welding attachment, being integrated with the outer edges of the underlying ribs 17 of the adjacent strip as indicated in Fig. 4. The projecting inner corners 18 of the strips may then be removed by any appropriate means to obtain a smooth inner wall surface and thus reduce heat transfer to the wall 10 due to scrubbing action.

Fig. 1 illustrates a fabricated plate, assembled of strips 10 as described, which may be used as a tube or cone wall for supporting and cooling purposes. Such a fabrication may be usefully employed as a wall for a jet afterburner, as a diffuser inner cone for high temperature engines, or for supercharging boundary layers.

In use, assuming hot fluid flow on the exit side of the wall 20, as indicated by arrow 21, coolant, such as air is drawn or forced through inlets 15 and ducts 14 and is emitted in uniform jets at exits 16. Since the channels 11 are inclined in the general direction of the main fluid flow, the coolant is drawn smoothly into the same direction of flow, as indicated by arrow 22, the coolant forming a film intermediate the hot main gases and the wall 20. The wall is further cooled by contact of the coolant with the duct surfaces in passing through the wall, it being observed that the groove 11 of each duct increases the contact area of the coolant on the strip by about one and one-half times, for the groove curvature as shown in Fig. 4. It is at once apparent that not only is the cooling efficient in that it is applied directly to the area where cooling is needed, but also that the cooling possesses a high degree of uniformity so that the distortion due to random cooling action is eliminated. It appears further that the cooling structure is sufficiently rigid to be self supporting and to be resistant to important transverse fluid pressures, as distinguished, for example, from wire cloth structures.

While various apparatus may be used in manufacturing the wall structure, that as indicated in Figs. 5 and 6 is suitable for simple fabrication. A frame 30 (Fig. 6) has terminal standards 31 between which a shaft 32 for rotatably supporting forming drum 33 is mounted. The drum 33 is shown as cylindrical but any desired form may be used.

Auxiliary end standards 35 on the frame 30 support a worm shaft 36 therebetween as well as slide rods 37 and 38, rod 37 supporting a rotatable flanged wheel or reel 40 adapted to receive a roll of wall strip 41, a slidable shaft 39, and rod 38 supporting slidably a shaft 42 upon which knurling wheel 43, provided with knurl ridges 44, is freely rotatable. An additional rod 45 adjacent rod 38 is mounted between standards 35 for support of a freely rotatable cylinder 46. This cylinder supplies the blocking area for coaction with knurling wheel 43 whereby a continuous series of uniform grooves are formed in one side of the surface of the strip when passed between the cylinder and wheel.

In order to hold wheels 40 and 43 in lateral alignment and to secure simultaneous axial adjustment of these units, a connecting frame 47 is provided in the form of a flat angular plate or spider having fixed connection to the travelling member 48 on the worm 36, the bearing 42 of knurled wheel 43, and the bearing 39 of strip reel 40. Connected also to this frame 47 is an arm 49 supporting at its end a welding roller 50 for binding the overlapped strips into an integral structure. Appropriate electric connections to the roller 50 are made in accordance with well known procedure.

It now appears that by passing the free end of strip 41 between cylinder 46 and knurling wheel 43, attaching the strip end to the drum 33 and rotating the drum in the direction indicated by the arrow, the strip is unwound from wheel 40, knurled by knurling wheel 43, and laid on the forming drum 33. Then, by rotating the worm in a direction to obtain a slow axial movement of the frame 47, the strip is overlapped, the preferable amount of overlap being such as to expose only a small fraction of the grooved surface of the strip, as indicated in Figs. 1 and 2. It is apparent that, as the worm 36 rotates, the overlapped strip forms a helix on the drum 33, the angle of pitch of the helix being regulated by the speed of worm and drum rotation. As the overlapped strip passes under the welding roller 50 a seam weld forms between the upper edges of the groove ridges and the adjoining base surface of the strip, as indicated in Fig. 4. Appropriate power means (not shown) are supplied for rotation of the worm shaft 36 and the drum 33. If necessary, retarding means, such as a frictional shoe, may be applied to strip reel 40 to prevent too free movement thereof.

Obviously, many modifications and variations of the present invention are possible in the light of the above teachings. It is therefore to be understood that within the scope of the appended claims the invention may be practiced otherwise than as specifically described.

What is claimed is:

1. In an apparatus for making tubular walls for heated conduits comprising a rotatable drum, means for rotatably supporting said drum, a screw shaft mounted on said drum support and extending parallel to the axis of the drum, a threaded slide member movable along said screw shaft, a spider member with projecting arms mounted on said slide member, a strip supply reel secured to one arm of said spider member, a strip securing means secured to another arm of said spider member and lying adjacent the outer periphery of said drum, and means for rotating said drum and screw shaft whereby a strip may be helically wound on said drum with its edges in overlapping relation by rotating the drum with one end of the strip attached thereto and at the same time advancing the slide member, reel and securing means along the simultaneously rotating screw shaft, and progressively fastening the overlapped strip portions together with said securing means.

2. The apparatus as defined in claim 1 including means for forming flow passages in the tubular walls which comprises a knurling wheel mounted for rotation on a third arm of said spider, a shaft mounted on said drum support and extending parallel to said screw shaft, and a blocking cylinder mounted on said shaft in close contiguity to the knurling wheel periphery, the knurling wheel and blocking cylinder being positioned between the supply reel and drum so that as the strip passes between the knurling wheel and blocking cylinder transverse uniform grooves will be formed on its surface.

References Cited in the file of this patent

UNITED STATES PATENTS

| | | |
|---|---|---|
| 1,323,621 | Edwards | Dec. 2, 1919 |
| 1,342,986 | Cater | June 8, 1920 |
| 1,800,642 | Johnson | Apr. 14, 1931 |
| 2,042,537 | Liddell | June 2, 1936 |
| 2,134,526 | McLaughlin | Oct. 25, 1938 |
| 2,431,743 | Fentress | Dec. 2, 1947 |
| 2,491,878 | Spagnola | Dec. 20, 1949 |